US007720885B2

(12) United States Patent
Jones et al.

(10) Patent No.: US 7,720,885 B2
(45) Date of Patent: May 18, 2010

(54) GENERATING A WORD-PROCESSING DOCUMENT FROM DATABASE CONTENT

(75) Inventors: Brian M. Jones, Redmond, WA (US); Tristan A. Davis, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 381 days.

(21) Appl. No.: 11/784,097

(22) Filed: Apr. 4, 2007

(65) Prior Publication Data

US 2008/0288861 A1 Nov. 20, 2008

(51) Int. Cl.
*G06F 17/30* (2006.01)

(52) U.S. Cl. ........................................ 707/804; 715/253

(58) Field of Classification Search ................. 707/102; 705/1; 715/253
See application file for complete search history.

(56) References Cited

U.S. PATENT DOCUMENTS

| 5,267,155 | A | 11/1993 | Buchanan et al. | 715/210 |
|---|---|---|---|---|
| 5,457,792 | A | 10/1995 | Virgil et al. | 707/3 |
| 5,845,303 | A * | 12/1998 | Templeman | 715/255 |
| 5,862,325 | A | 1/1999 | Reed et al. | 709/201 |
| 6,154,753 | A | 11/2000 | McFarland | 715/221 |
| 6,209,004 | B1 | 3/2001 | Taylor | 715/236 |
| 6,473,794 | B1 * | 10/2002 | Guheen et al. | 709/223 |
| 6,632,251 | B1 | 10/2003 | Rutten et al. | 715/205 |
| 6,714,939 | B2 | 3/2004 | Saldanha et al. | 707/102 |
| 6,961,776 | B1 | 11/2005 | Buckingham et al. | 709/229 |
| 6,996,571 | B2 | 2/2006 | McConnell | 707/101 |
| 7,107,264 | B2 | 9/2006 | Lu | 707/3 |
| 2002/0077846 | A1 | 6/2002 | Bierbrauer et al. | 705/1 |
| 2002/0087600 | A1 | 7/2002 | Newbold | 715/209 |
| 2002/0184401 | A1 * | 12/2002 | Kadel et al. | 709/315 |
| 2003/0018644 | A1 | 1/2003 | Bala et al. | 707/100 |
| 2003/0140097 | A1 | 7/2003 | Schloer | 709/203 |
| 2003/0145018 | A1 | 7/2003 | Hitchcock et al. | 707/104.1 |
| 2004/0098284 | A1 | 5/2004 | Petito et al. | 705/1 |
| 2004/0153465 | A1 | 8/2004 | Singleton et al. | 707/100 |
| 2005/0154983 | A1 | 7/2005 | Hailey et al. | 715/234 |
| 2005/0235202 | A1 * | 10/2005 | Chen et al. | 715/523 |
| 2005/0278623 | A1 | 12/2005 | Dehlinger et al. | 715/243 |
| 2005/0289446 | A1 | 12/2005 | Moncsko et al. | 715/205 |
| 2006/0020519 | A1 | 1/2006 | Schroeder et al. | 705/26 |
| 2006/0069989 | A1 | 3/2006 | Jones et al. | 715/273 |
| 2006/0173865 | A1 | 8/2006 | Fong | 707/100 |
| 2006/0190815 | A1 | 8/2006 | Jones et al. | 715/210 |

(Continued)

OTHER PUBLICATIONS

FitzGerald, Neil et al., "Crystal Reports XI: Official Guide", Sams, Nov. 1, 2006; proquest.safaribooksonline.com/0672329174.*

(Continued)

*Primary Examiner*—Shahid A Alam
(74) *Attorney, Agent, or Firm*—Merchant & Gould, P.C.

(57) ABSTRACT

Documents are automatically generated from data within a database. The look and feel of the document is defined externally from the data in the database such that a consistent look and feel is applied to the retrieved data. Templates are defined that specify the structure of the document including its look and feel for the documents created by using data from the database. When a document is requested to be generated for viewing and/or editing, the appropriate data from the database is retrieved and placed within the document according to the defined look and feel that is contained within the templates.

20 Claims, 4 Drawing Sheets

U.S. PATENT DOCUMENTS

| | | | |
|---|---|---|---|
| 2006/0193008 A1 | 8/2006 | Osaka et al. | 358/1.18 |
| 2006/0195454 A1 | 8/2006 | Davis et al. | 707/100 |
| 2006/0253478 A1 | 11/2006 | Graham et al. | 707/100 |
| 2006/0259854 A1 | 11/2006 | Walker et al. | 715/234 |
| 2006/0271519 A1 | 11/2006 | Blackwood et al. | 707/3 |
| 2006/0288278 A1 | 12/2006 | Kobayashi | 715/209 |
| 2007/0033213 A1 | 2/2007 | Bezrukov et al. | 707/102 |
| 2007/0282616 A1* | 12/2007 | Brunswig et al. | 705/1 |
| 2008/0154873 A1 | 6/2008 | Redlich et al. | 707/5 |
| 2008/0250052 A1 | 10/2008 | Jones et al. | 707/102 |
| 2008/0250394 A1 | 10/2008 | Jones et al. | 717/123 |

OTHER PUBLICATIONS

Evermore Software; "*EIOffice 2007*"; http://www.evermoresw.com/weben/product/integrated.jsp; 2006; 2 Pgs.

Madhva, Sanjay Kumar; "*Generating a WordprocessingML Table from a Data Source*"; Open XML Developer.org; http://openxmldeveloper.org/articles/generatewordtable.aspx; May 24, 2006; 27 Pgs.

Mitchell, Scott; "*Generate Office Documents, Monitor Event Logs, and More*"; MSDN; http://msdn.microsoft.com/msdnmag/issues/06/06/Toolbox/default.aspx; Jun. 2006; 8 Pgs.

Adboe; "*Adobe Solutions for Document Generation*"; http://adobe.com/products/server/pdfs/document_generation_wp.pdf; 2003; 17 Pgs.

* cited by examiner

GENERATING A WORD-PROCESSING DOCUMENT FROM DATABASE CONTENT

RELATED APPLICATIONS

U.S. patent application Ser. No. 11/784,165, filed Apr. 4, 2007, entitled "REPOPULATING A DATABASE WITH DOCUMENT CONTENT" and Ser. No. 11/784,163, filed Apr. 4, 2007, entitled "SYNCHRONIZING EXTERNAL DOCUMENTATION WITH CODE DEVELOPMENT" assigned to the assignee of the present application, are related to the present application.

BACKGROUND

Many times data that is stored within a database system is better presented in the context of a word processing document for ease of readability by the intended audience. For example, data about an Application Programming Interface (API) may be stored within a database as items in a table (each method, property, and object in the API), but the documentation for the API is better presented as a word processing document. Similarly, product data may be stored within a database but the product descriptions are better viewed within a word processing document. Creating word processing documents comprised primarily from data within a database, however, is challenging.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Word processing documents are automatically generated using a subset of data from a database. The document's settings are defined externally from the data in the database such that a consistent look and feel may be applied to each of the documents that are generated using the data from the database. For instance, templates may be defined to produce a consistent look and feel for the documents created by using data from the database. When a document is requested to be viewed and/or edited, the appropriate data from the database is retrieved and placed within the document according to the defined document settings. The data within the database does not need to include all of the metadata required to produce the document having the desired look and feel.

DETAILED DESCRIPTION

Figure 1:
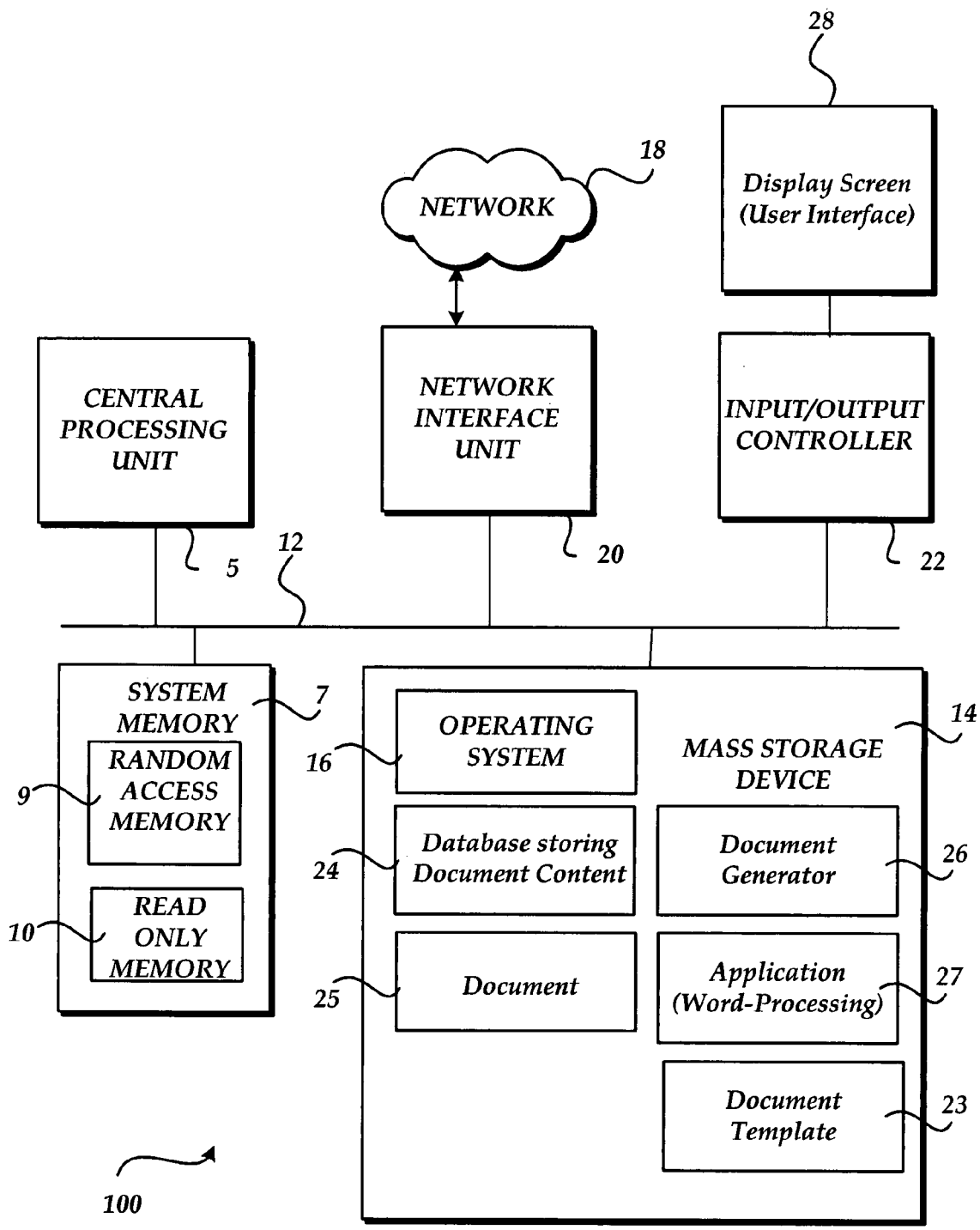
FIG. 1 illustrates an exemplary computing device.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM") and a read-only memory 10 ("ROM"), and a system bus 12 that couples the memory to the CPU 5. A basic input/output system containing the basic routines that help to transfer information between elements within the computer, such as during startup, is stored in the ROM 10. The computer 100 further includes a mass storage device 14 for storing an operating system 16, application program 27 and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen 28 having a user interface that is configured to receive selections from a user for determining sections of a document to generate.

As mentioned briefly above, a number of program modules and data files may be stored in the mass storage device 14 and RAM 9 of the computer 100, including an operating system 16 suitable for controlling the operation of a networked personal computer, such as the WINDOWS VISTA operating system from MICROSOFT CORPORATION of Redmond, Wash. The mass storage device 14 and RAM 9 may also store one or more program modules. In particular, the mass storage device 14 and the RAM 9 may store database 24. Database 24 may be configured to store many different types of data. For example, the data may relate to elements of an API, records relating to a product, and the like. Generally, database 24 contains any type of data which are used to generate a document. While database 24 is shown on computer 100, database 24 may be stored within in any data store, such as on a data store on network 18.

The document generator 26 is operative to automatically generate document 25 using data from database 24. For example, a user may select one or more sections of a document(s) to be created from database 24 utilizing user interface 23. Database 24 is configured to store multiple disparate regions of rich content that can contain rich word processing content (pictures, etc.) without requiring each piece of content within the database to define all of the necessary document metadata required to generate a document. The look and feel of the document is defined externally from the data in the database such that a consistent look and feel may be applied to the retrieved data. For instance, one or more document templates 23 may be defined to produce a consistent look and feel for the documents generated. According to one embodiment, there is a template type that defines the look and feel of the document and there is a template type for translating a database record into the document.

When a document is requested to be viewed and/or edited, the appropriate data from the database is automatically retrieved and placed within the document according to the defined look and feel.

As discussed, document template 23 defines the look and feel of document 25 and is used to define other document settings for the document content. The template may be used to include settings such as fonts, page layout, header/footer information, special formatting, styles and the like. In this way, the document settings do not need to be included within the data of the database 24. Templates allow consistency between documents that are generated by document generator 26. Any method of storing document settings, however, may be used to define the structure of document 25. For example, a list may be maintained within mass storage device 14 that contains the document settings.

Although documentation generator 26 is shown as a separate application, it may be included directly within an application program 27 or at some other location. The operation of documentation generator 26 will be described in more detail below.

Figure 2:
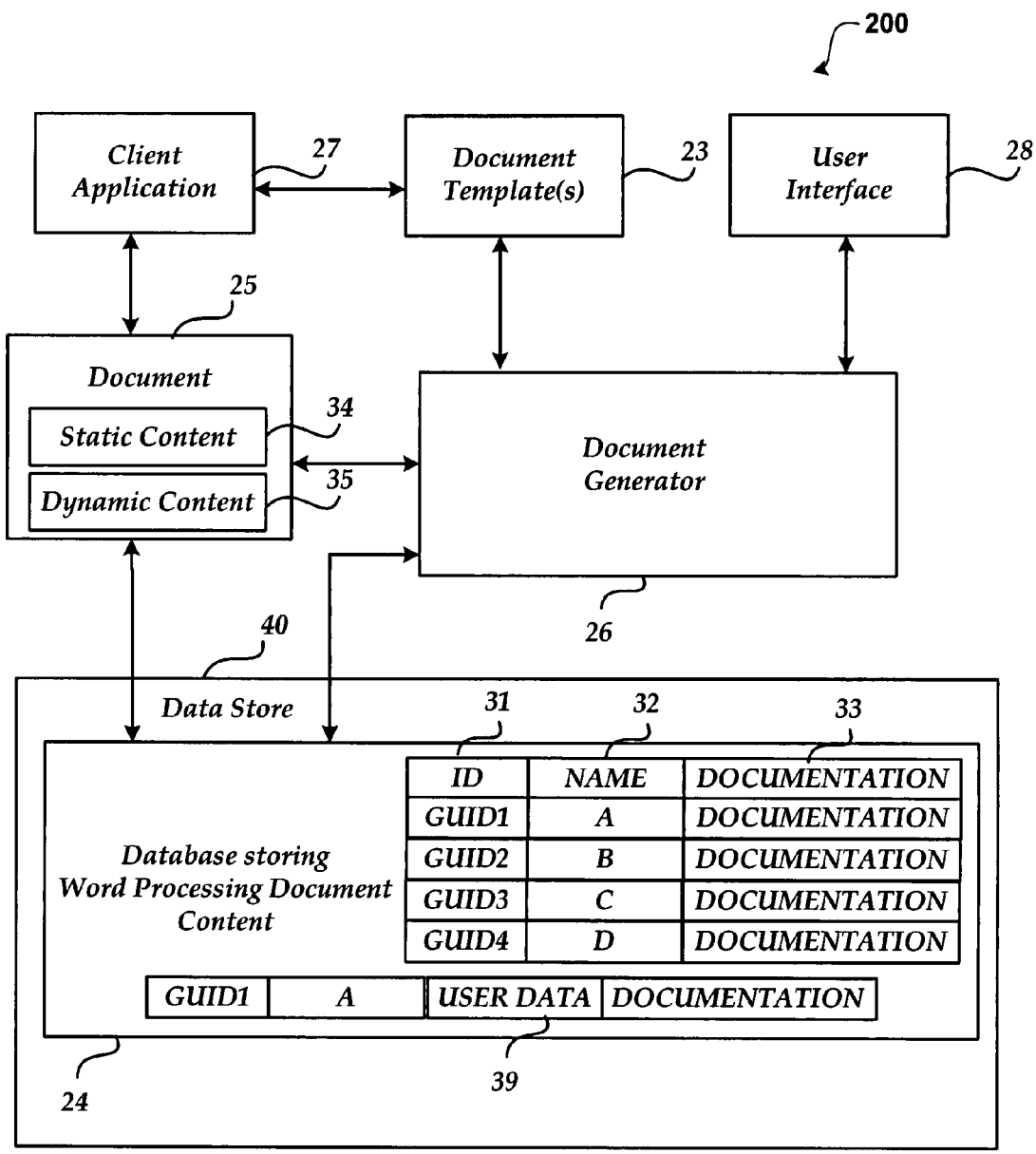
FIG. 2 shows a document generation system for generating documents from data within a database.

FIG. 2 shows document generation system 200 for generating documents from database content. As illustrated, document generation system 200 includes client application 27, document template(s) 23, user interface 28, document generator 26, data store 40 containing database 24 and document 25. System 200 is directed at automatically generating documents having a consistent look and feel from data within a database. The data from the database that is used in generating the document typically includes rich content that may contain standard word processing content (pictures, etc.). The data within the database, however, is not required to define all of the necessary document metadata to create the document. In this way, the data within database is greatly reduced. Additionally, it is easier to change the look and feel of documents that are generated by document generator 26 since each record within the database does not need to be updated to reflect the desired look and feel of the document.

Client application 27 may be used to manage the document settings including the structure and formatting of the document (i.e. look and feel) on a global level without affecting any of the pieces of the data stored within database 24. For example, client application 27 may use and create one or more document templates 23 to define the structure of the document 25. The templates may define the styles, numbering, and the like that are used when generating the document. The template(s) 23 also may be used to define the location in which the constituent parts of the assembled document appear within the overall document. Document generator 26 is also configured to generate portions of a document such that multiple authors may work on the document at the same time without conflicting.

According to one embodiment, document 25 includes static content 34 and dynamic content 35. Static content 34 is content that does not change and cannot be edited. Static content may be retrieved from database 34 and/or may be content which is predefined within template 23 or at some other location. Dynamic content 35 is content that may change (is edited by the recipient of the document) and is content that is retrieved from database 24. The location for dynamic content 35 may be defined within a template as a content placeholder for a specific piece of information that is obtained from a specific row in the database. The document generator 26 is used to populate the dynamic content 35 by copying the data into the document using template 23.

A user interface 28 allows a user, such as a documenter, to select any section(s) or subsection(s) of the database 24 that they would like generated based on a document hierarchy structure that has been defined within template(s) 23. The user interface may also be used to specify the editing permissions for the document. For example, a user may only desire to read the document, in which case the document may be opened as a read-only document. In this case, a user that requests editing permissions for the same document would be allowed to edit the document.

In response to the selection request for the section(s) of the document, document generator 26 receives the selections from the user interface 28 and generates the desired section(s) of the document for the user. In order to generate the document, the user interface selections received from the user are translated into a database query against the database 24 (e.g. a SQL SELECT statement) for the appropriate sections and subsections of the documents. According to one embodiment, a copy of the document template 23 is created to have the set of styles and formatting used for the document. Then, for each item in the query, the template for the section is used to copy over the static content and dynamic content. According to one embodiment, the static content is first obtained which provides the document generator 26 with the information used to obtain the dynamic content. The document template for the section includes the definition for the output of each item in the section, which are copied and populated with both the static content and the dynamic content from the appropriate row within the database. Part of the dynamic content that is obtained is a fragment for the rich content item(s) in the section. As discussed above, each of the content items does not include all the information needed to express them. According to one embodiment, when these rich content items are inserted into the template they are valid against the schemas for the open document format of the word processing document since they are fragments of that greater whole. The resulting document is then assembled by document generator 26 with one consistent look and feel and the desired subset of content and returned to the caller.

According to one embodiment, when any section or subsection is retrieved in generating a document, those records within database 24 are marked such that a concurrent request for that section may be handled appropriately. For example, if a section is opened for editing, a subsequent section may be opened as "read only" such that two users are not editing the same section. An example of document generation system 200 will now be described. The following is merely an example and is not intended to be limiting.

The following example relates to generating a document that documents an XML based syntax that is stored within a database. When developing source code, such as an XML-based syntax, it is common to provide documentation for the source code. Generally, documentation for the source code is created to be user-friendly that completely and accurately describes the source code. As such, a rich formatting of the documentation is typically desired. Document generator 26 is configured to create a document 25 such that a documenter may edit the content retrieved from database 24 within a word-processing document in a user friendly manner. In the current example, the database 24 contains at least one field, such as documentation field 33, that may be edited by a user. More or less fields may be contained within database 24. For example, a user data field 39 may be included that may be edited.

According to one embodiment, each row of the database 24 is uniquely identified such that the row can be identified even when an identifying characteristic, such as the name, of an element changes. For example, in XML elements, even when the typical identifying characteristics of those elements change (e.g., their names, content models, etc.) the element can remain associated with the documentation. In order to identify each row of the database, each row is annotated with a unique ID. For example, each row may be identified by a separate unique GUID (globally unique identifier) 31.

As discussed above, the database 24 contains data that is used to populate document 25. Some of the data may be used for populating static content of the document while other data may be used for populating dynamic content of the document. For example, name field 32 may be considered static content and the documentation field 33 may be considered dynamic content. Many more fields may be contained in each row. For instance, a field may contain metadata, user data 39, and the like. Another field that may be included within database 24 is a relationship field (not shown) that may specify the relationship of one row to another. In the example presented, a relationship field may be used to store the parent/child relationships of the XML schema files such that a simple query may be used against the database to return content relating to a parent and its children when constructing document 25. In some embodiments, it may be advantageous to configure database 24 such that it provides an easy way to view the functionality of the code without directly accessing the code.

When a documenter desires to view and/or edit documentation for the XML, the documenter requests a portion of the document to be generated. According to one embodiment, user interface 28 is used to receive the selection request. In response to the request, the document generator 26 extracts the requested content from database 24 and places the content into document 25 according to the settings specified in document template 23. Documentation 25 may take many different forms such as a single file, multiple files and the like. For example, content from database 24 could be extracted and then placed into templates into documentation 25. Documentation could be in the form of MICROSOFT WORD files or some other document format.

According to one embodiment, when a document 25 is created, document generator 26 maintains the unique identifier 31 that is associated with each row in the database within document 25 such that the location of the content within the document can be traced back to the database. For example, document 25 may include a tag that specifies the identifier (i.e. the GUID) that identifies which row of the database the content is associated with. The tag may take many different forms. For example, when the document is stored as XML, the tag may be an XML tag that is placed near the retrieved content. Any method of tagging the content, however, may be used. The GUIDs 31 associated with each row provide a permanent link from the row in the database to the generated document 25.

Figure 3:
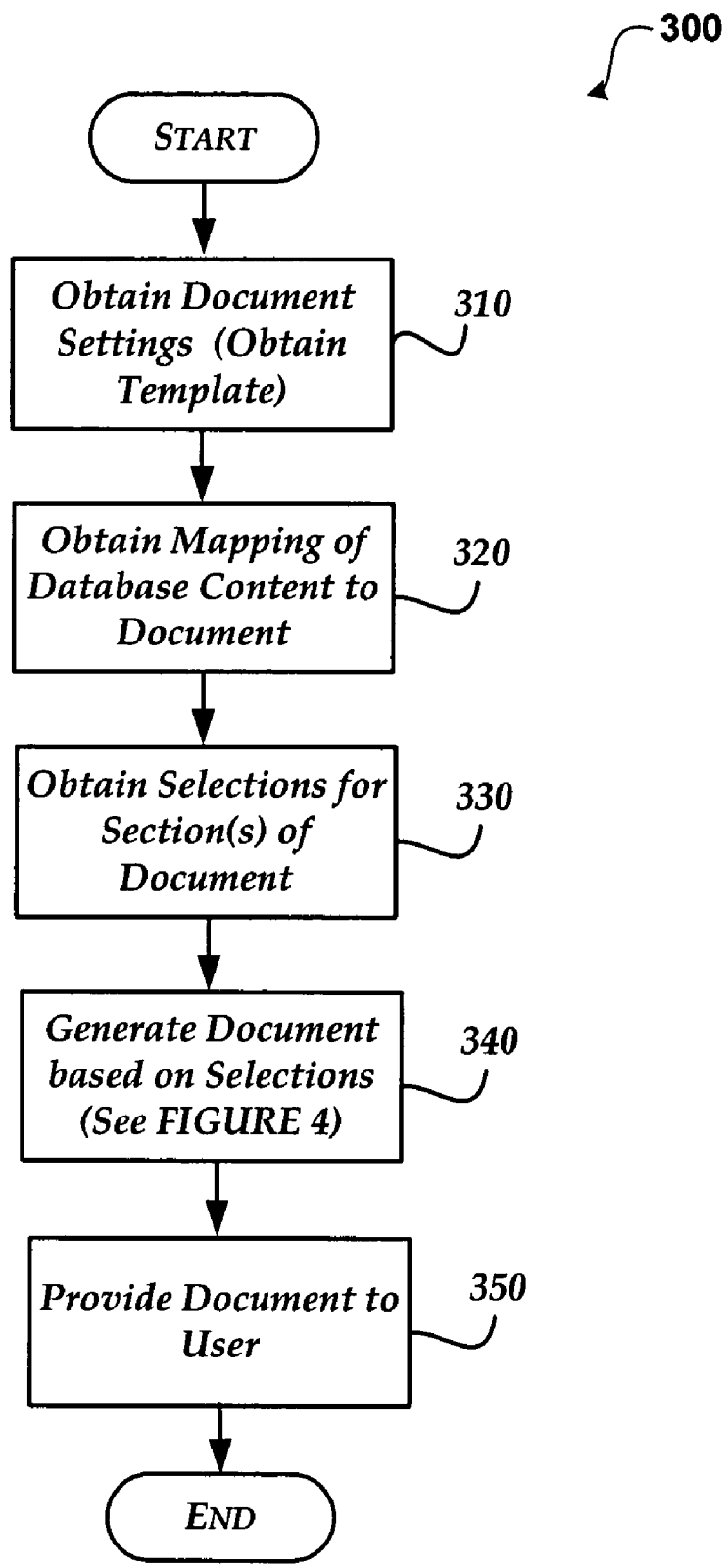
FIG. 3 shows an illustrative process for defining a document structure and generating a document from data within a database.

Referring now to FIG. 3, an illustrative process for defining a document structure and generating a document from content within a database is described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 310, where the settings of the document are obtained. According to one embodiment, a client application such as a word processing application is used to create a template(s) to define the look and feel of the document as well as the structure of the document such that when content from the database is retrieved and presented, a consistent look and feel is provided to the user. The template may specify items such as: header/footer information; styles; formatting; location of dynamic content and static content, and the like.

Moving to operation 320, the template providing mapping of the database content to the document is obtained. The mapping of the database content may be determined in many different ways. For example, the template may be used to define what data from the database is placed into what locations of the document. A field within each row of the database may also be used to specify the location of the data. Similarly, a mapping file may be used to map the data from the database to a document location.

Transitioning to operation 330, the selections for the section(s) to be generated for a document are obtained. According to one embodiment, a user selects the sections of the document to view/edit within a user interface. Other methods may also be used. For example, a predefined list may be used. The section(s) may be as few as one subsection of the document or be as large as the entire document.

Figure 4:
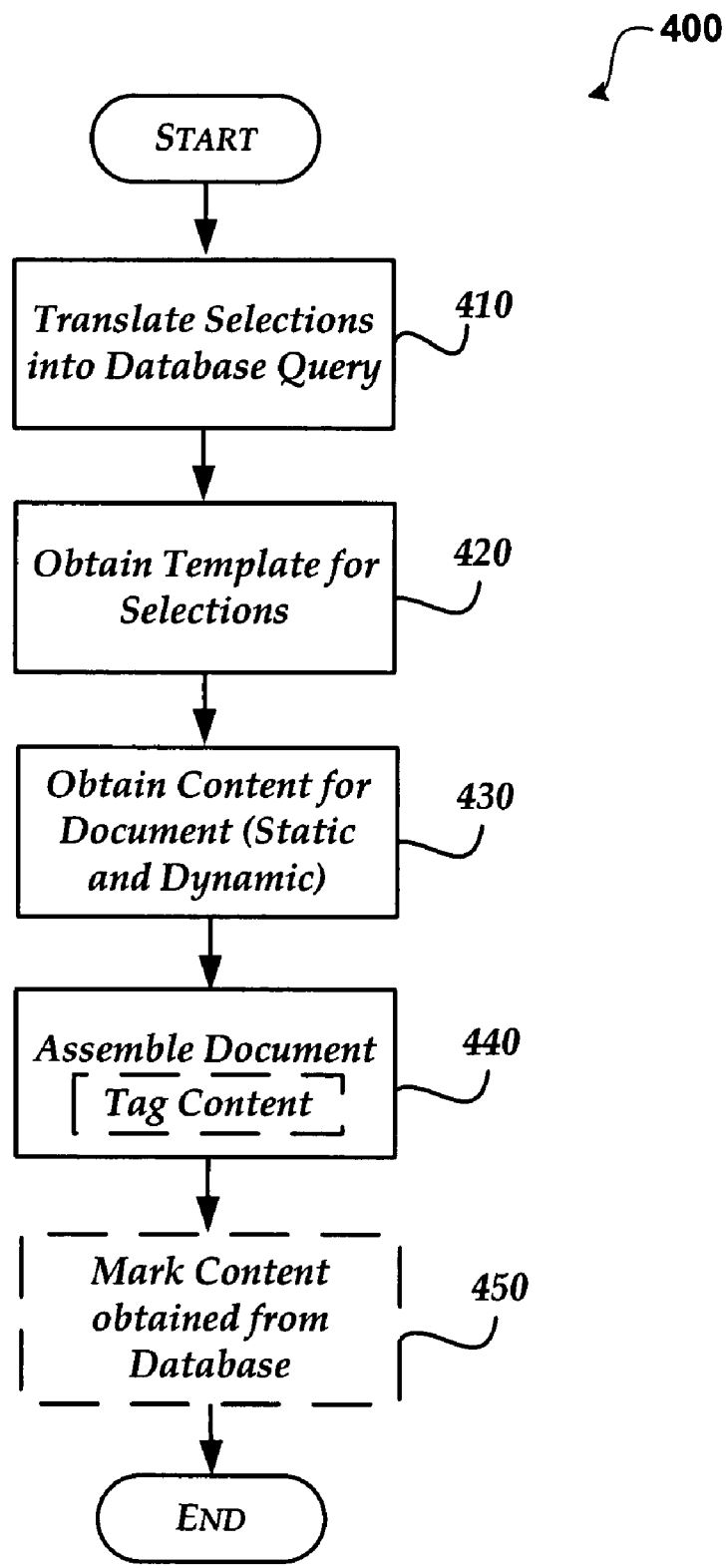
FIG. 4 shows an illustrative process for generating a document from data within a database.

Moving to operation 340, the document is generated based on the selections (See FIG. 4 and related discussion). Generally, content from the database is retrieved from the database in response to the selections and then copied into the document using the created template(s).

The process then flows to operation 350 where the document is provided to the user. For example, the document may be provided through a word-processing application and/or the file itself may be provided.

The process then flows to an end operation and returns to processing other actions.

FIG. 4 shows an illustrative process for generating a document from data within a database.

After a start operation, the process flows to operation 410, where the selections for the document are translated into queries against the database to retrieve the appropriate content. For example, if the section of the document to be generated relates to product A, then the database query(s) are created to retrieve content from the database relating to product A.

Moving to operation 420, the corresponding template(s) for the requested section(s) is obtained. The template that is obtained is based on the content of the requested section. The template is used when copying data from the database to the document such that the document maintains a consistent look and feel and the content is placed into the correct location of the document.

Transitioning to operation 430, the content for the document is obtained from the database. The content retrieved from the database may be editable content (dynamic content) and/or non-editable content (static content). According to one embodiment, one set of queries obtains the static content and another set of queries obtains the dynamic content. Any method of extracting the data from the database, however, may be utilized. For example, a single query may be constructed to retrieve the content from the database.

Flowing to operation 440, the document is assembled. As discussed above, the templates are used when copying the data into the document.

Moving to operation 450, the content from the database is marked such that concurrent generations of the same section of the document may be appropriately handled. For example, the marking of the content may be used to indicate that the content is being edited or just viewed.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating a document, comprising:
    obtaining document settings for the document that include specifications for a location of data within the document; a layout of the document; and a formatting of the document;
    retrieving data from a database to be included within the document; wherein the data retrieved from the database does not include all of the metadata used to generate the document; and
    generating the document by placing the retrieved data within the document and applying the obtained document settings to the retrieved data within the document; wherein the document settings are maintained externally from the data within the database; wherein when a portion of the retrieved data within the document is edited, the corresponding data within the database is updated.

2. The method of claim 1, further comprising receiving a selection to determine a section of the database to use in generating the document.

3. The method of claim 1, wherein obtaining document settings for the document further comprises accessing a template that defines global settings for the document.

4. The method of claim 3, wherein the template is created using a client application.

5. The method of claim 3, wherein the document includes static content that is non-editable and dynamic content that is editable.

6. The method of claim 3, wherein generating the document by applying the obtained document settings to the retrieved data comprises applying the template to the retrieved data.

7. The method of claim 3, wherein retrieving data from the database to be included within the document comprises creating a database query to extract data from the database.

8. The method of claim 3, further comprising marking the data that has been retrieved within the database such that it can be determined that the data has been retrieved.

9. The method of claim 3, further comprising tagging the data placed within the document such that the data within the document is linked to the database.

10. A computer-readable storage medium having computer-executable instructions for generating a document using data from a database, the instructions comprising:
    determining at least one section of the document to generate;
    obtaining document settings for the at least one section of the document that defines global settings for the document; wherein the global settings define at least a style and a formatting options and wherein the document settings are maintained externally from data within the database that is included within the at least one section;
    retrieving data from a database to be included within the document based on the at least one section of the document to generate; wherein the data retrieved from the database includes rich content but does not include all of the metadata used to generate the document;
    applying the obtained document settings to the retrieved data; and
    placing the retrieved data within the at least one section of the document; wherein when a portion of the retrieved data within the at least one section of the document is edited, the corresponding data within the database is updated.

11. The computer-readable medium of claim 10, wherein the document settings are defined within a template created by a client application; and wherein the template defines locations for static content that is non-editable and dynamic content that is editable; wherein each of the locations of the dynamic content corresponds to a location within the database.

12. The computer-readable medium of claim 10, wherein applying the obtained document settings to the retrieved data comprises applying a user-defined template to the retrieved data.

13. The computer-readable medium of claim 12, wherein retrieving data from the database to be included within the document comprises creating a first database query to extract static data from the database and creating a second query to extract dynamic data from the database.

14. The computer-readable medium of claim 12, further comprising marking the data that has been retrieved within the database such that it can be determined upon a concurrent selection of the at least one section that the data has been retrieved.

15. The computer-readable medium of claim 12, further comprising tagging the data placed within the at least one section of the document such that the data within the document is linked to the database.

16. A system for generating a document using data from a database, comprising:

a processor and a computer-readable storage medium;

an operating environment stored on the computer-readable medium and executing on the processor;

a user interface that is configured to receive a selection for a section of the document to generate;

a template that defines document settings and a structure for the document;

a database having rows and columns; wherein the database includes a unique identifier that uniquely identifies a location for each piece of data that is included within the document and wherein the database includes the data used in generating the document; wherein the data within the database includes rich content but does not include all of the metadata used to generate the document; and a document generator that is configured to:

retrieve data from the database in response to selections received through the user interface;

apply the template to the retrieved data; and generating the document by placing the retrieved data within the document; wherein when a portion of the retrieved data within the document is edited, the corresponding data within the database is updated.

17. The system of claim 16, wherein the document includes static content that is non-editable and is retrieved before obtaining dynamic content that is editable from the database.

18. The system of claim 16, wherein the rich content within the database is structured as well formed XML.

19. The system of claim 16, wherein the document generator is further configured to mark the data that has been retrieved within the database as retrieved.

20. The system of claim 16, wherein the document generator is further configured to tag the data placed within the document such that the data within the document is linked to the database.

* * * * *